(12) United States Patent
Szpetkowski et al.

(10) Patent No.: US 10,701,897 B2
(45) Date of Patent: Jul. 7, 2020

(54) FELINE SCRATCH PAD ASSEMBLY

(71) Applicants: Jerzy Szpetkowski, Newark, CA (US);
Claudia Szpetkowski, Newark, CA (US)

(72) Inventors: Jerzy Szpetkowski, Newark, CA (US);
Claudia Szpetkowski, Newark, CA (US)

( * ) Notice: Subject to any disclaimer, the term of this patent is extended or adjusted under 35 U.S.C. 154(b) by 414 days.

(21) Appl. No.: 15/827,239

(22) Filed: Nov. 30, 2017

(65) Prior Publication Data
US 2019/0159430 A1 May 30, 2019

(51) Int. Cl.
A01K 15/02 (2006.01)

(52) U.S. Cl.
CPC .................. A01K 15/024 (2013.01)

(58) Field of Classification Search
CPC .................................................. A01K 15/024
See application file for complete search history.

(56) References Cited

U.S. PATENT DOCUMENTS

| 4,285,337 A | 8/1981 | Cosentino |
| 4,526,164 A | 7/1985 | Bihl |
| 4,622,961 A | 11/1986 | Christensen |
| 4,625,719 A | 12/1986 | Chambers |
| 5,592,901 A * | 1/1997 | Birmingham ........ A01K 15/024 119/706 |
| 6,343,569 B1 * | 2/2002 | Buendiger ........... A01K 15/024 119/706 |
| D577,123 S | 9/2008 | True |
| 7,841,997 B1 | 11/2010 | Heller |
| 2005/0039695 A1 * | 2/2005 | Deming, Jr. ......... A01K 15/024 119/706 |
| 2008/0015479 A1 | 1/2008 | Soscia |
| 2011/0290198 A1 * | 12/2011 | Pemberton ............. A01K 1/035 119/712 |
| 2019/0373858 A1 * | 12/2019 | Stewart ................ A01K 15/024 |

FOREIGN PATENT DOCUMENTS

WO  WO2013032449  3/2013

* cited by examiner

Primary Examiner — Jessica B Wong

(57) ABSTRACT

A feline scratch pad assembly includes a stand that is positioned between a foot of an article of furniture and a floor. The stand is positioned to extend upwardly along a corner on the article of furniture. A plurality of scratch pads is each releasably positioned on the stand to cover the corner on the article of furniture. Each of the scratch pads is comprised of a deformable material to withstand being clawed by a feline thereby satisfying the feline's urge to claw. A pair of mounts is provided and each of the mounts is coupled to an associated one of the scratch pads. Each of the mounts releasably engages the stand thereby retaining the scratch pads on the stand.

7 Claims, 7 Drawing Sheets

FELINE SCRATCH PAD ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to scratch pad devices and more particularly pertains to a new scratch pad device for protecting furniture from feline clawing.

BRIEF SUMMARY OF THE INVENTION

An embodiment of the disclosure meets the needs presented above by generally comprising a stand that is positioned between a foot of an article of furniture and a floor. The stand is positioned to extend upwardly along a corner on the article of furniture. A plurality of scratch pads is each releasably positioned on the stand to cover the corner on the article of furniture. Each of the scratch pads is comprised of a deformable material to withstand being clawed by a feline thereby satisfying the feline's urge to claw. A pair of mounts is provided and each of the mounts is coupled to an associated one of the scratch pads. Each of the mounts releasably engages the stand thereby retaining the scratch pads on the stand.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
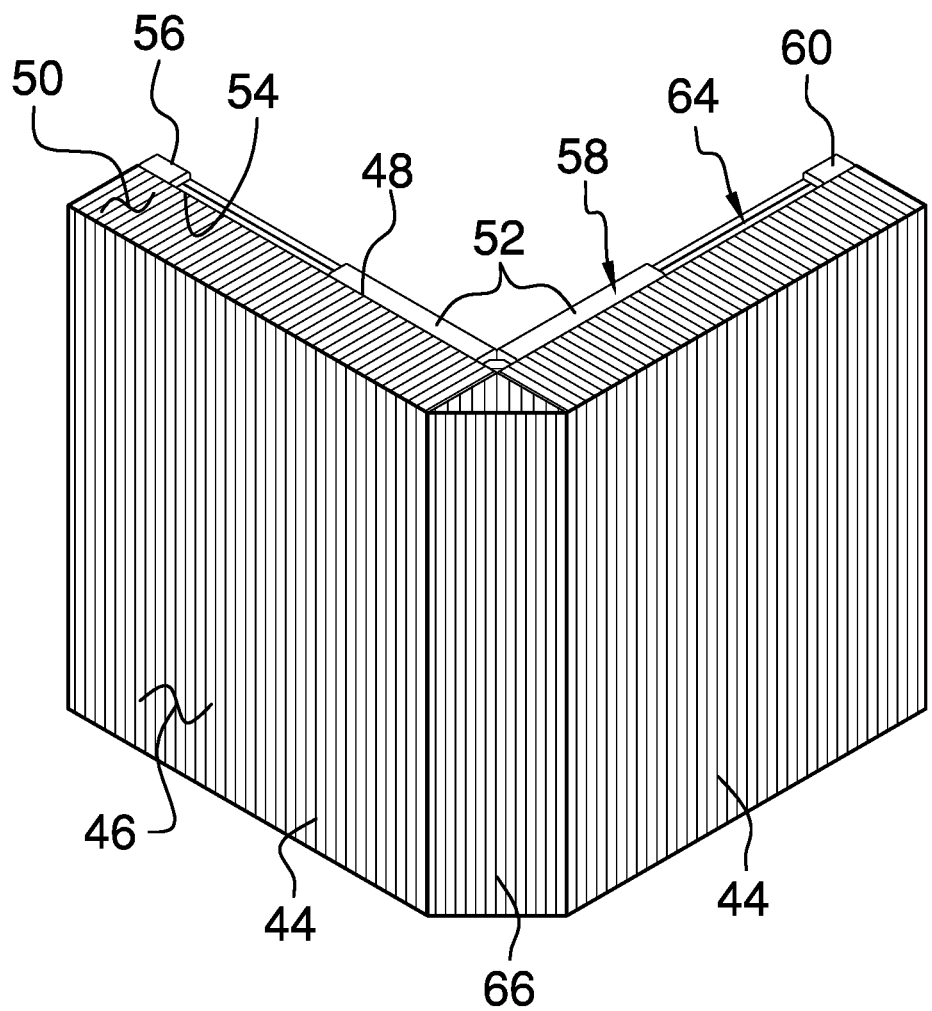
FIG. 1 is a front perspective view of a feline scratch pad assembly according to an embodiment of the disclosure.
Figure 2:
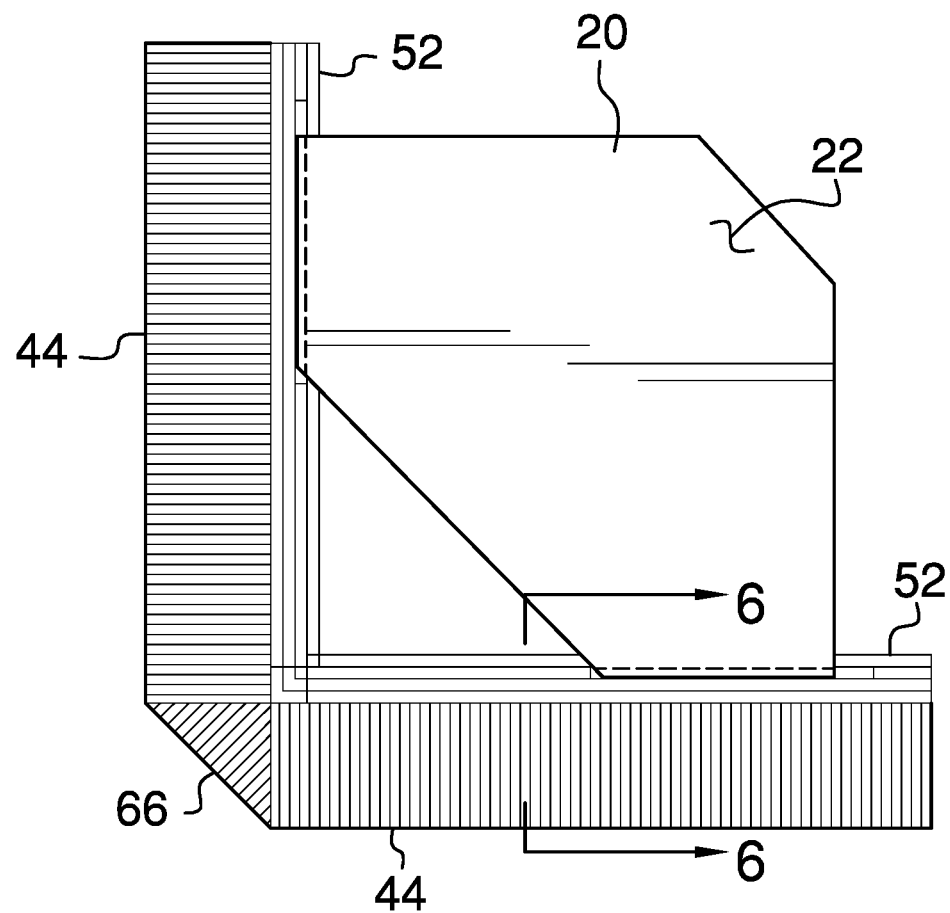
FIG. 2 is a bottom view of an embodiment of the disclosure.
Figure 3:
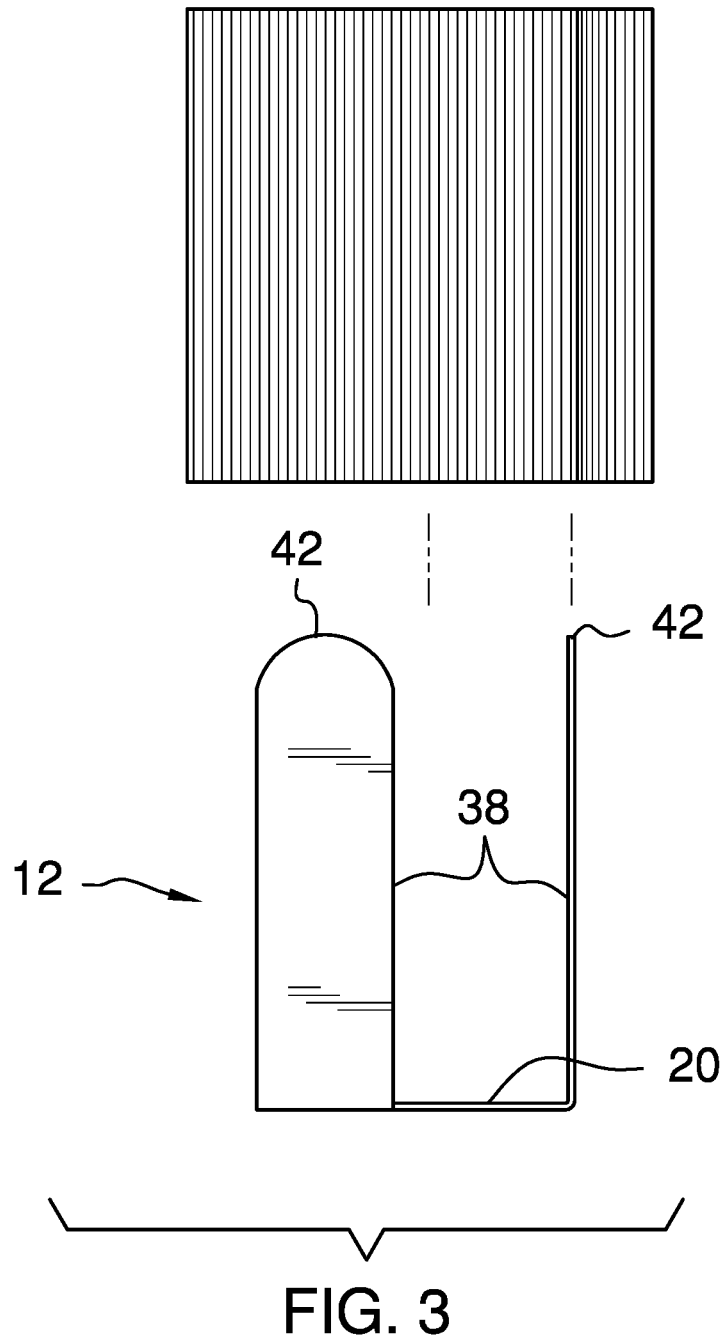
FIG. 3 is an exploded perspective view of an embodiment of the disclosure.
Figure 4:
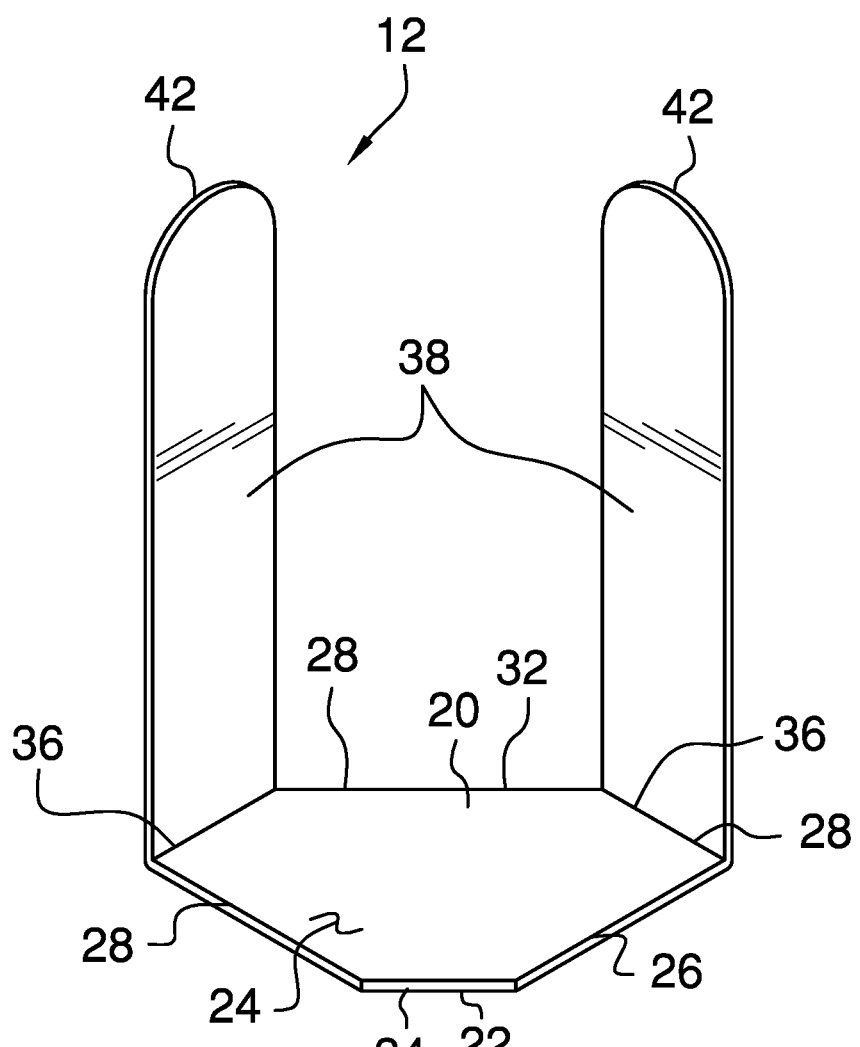
FIG. 4 is a back view of a stand of an embodiment of the disclosure.
Figure 5:
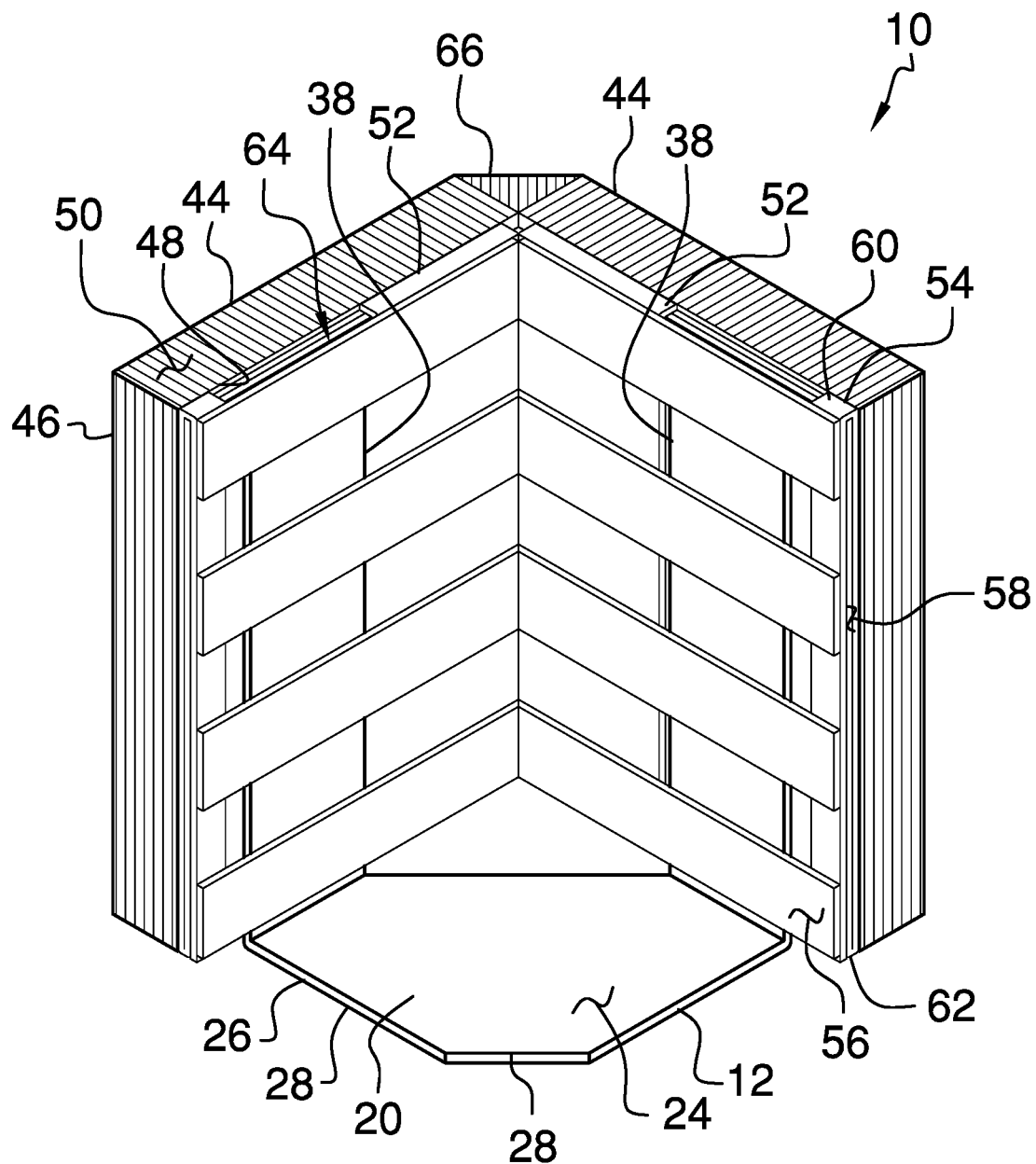
FIG. 5 is a back perspective view of an embodiment of the disclosure.
Figure 6:
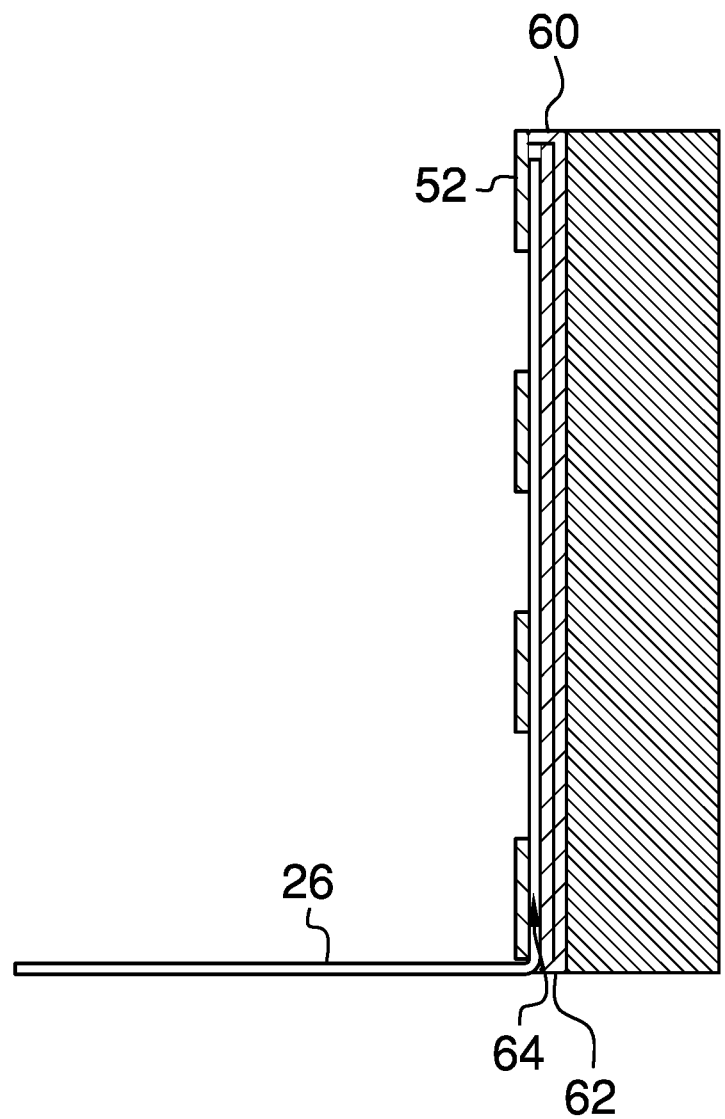
FIG. 6 is a cross sectional view taken along line 6-6 of FIG. 2 of an embodiment of the disclosure.
Figure 7:
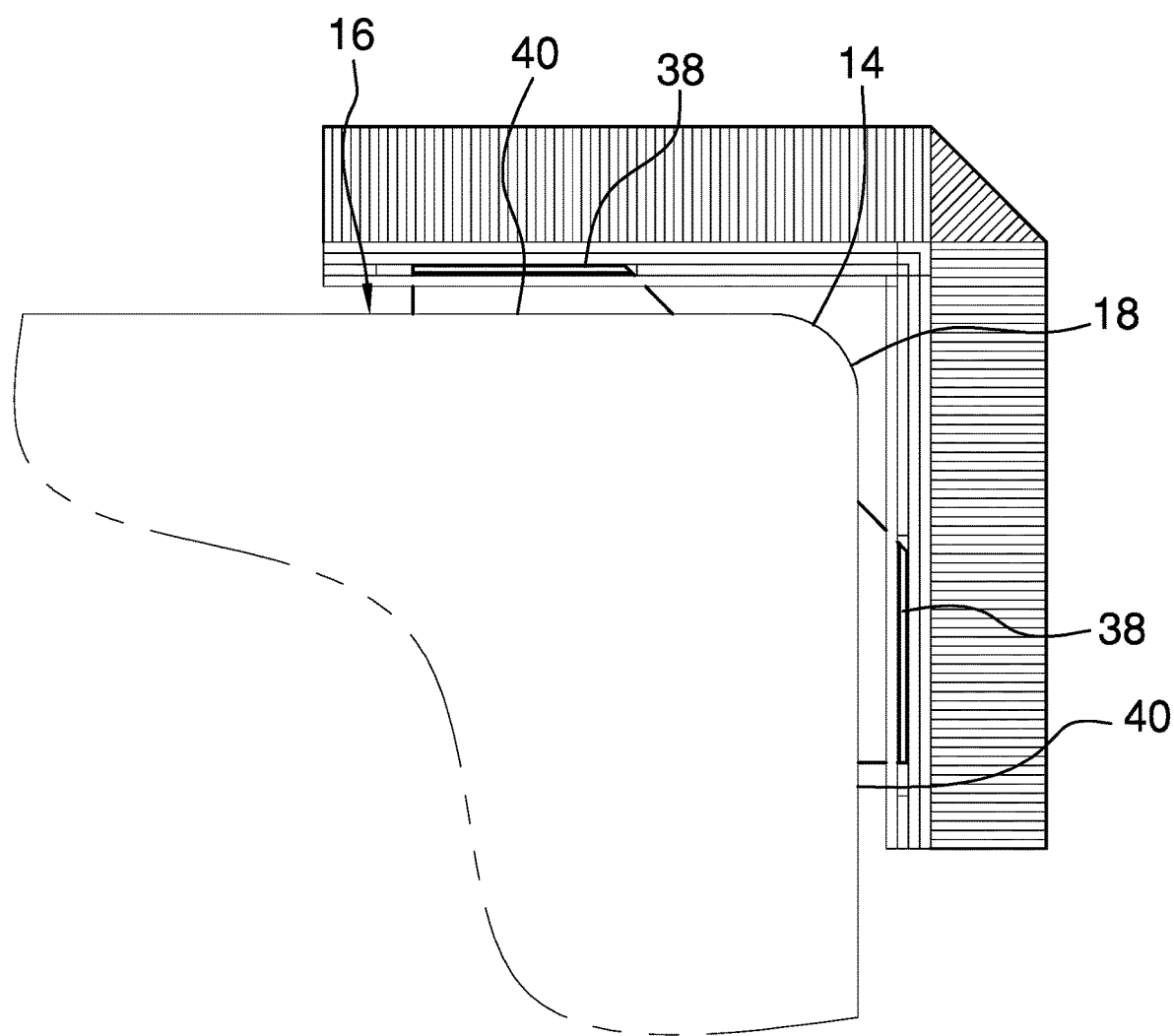
FIG. 7 is a perspective in-use view of an embodiment of the disclosure.

With reference now to the drawings, and in particular to FIGS. 1 through 7 thereof, a new scratch pad device embodying the principles and concepts of an embodiment of the disclosure and generally designated by the reference numeral 10 will be described.

As best illustrated in FIGS. 1 through 7, the feline scratch pad assembly 10 generally comprises a stand 12 that is positioned beneath a foot 14 of an article of furniture 16. The article of furniture 16 may be a sofa, a chair and any other article of furniture 16 that felines habitually scratch and damage. The stand 12 extends upwardly along a corner 18 on the article of furniture 16. Additionally, the article of furniture 16 may be positioned in a living room, a dining room and any other room in a home that keeps cats as pets.

The stand 12 comprises a panel 20 that has a first surface 22, a second surface 24 and a peripheral edge 26 extending therebetween. The peripheral edge 26 has a plurality of intersecting sides 28 such that the panel 20 has an elongated hexagonal shape. The first surface 22 lies on a support surface 30 and the foot 14 of the article of furniture 16 is positioned on the second surface 24. The plurality of intersecting sides 28 includes a first lateral side 32, a second lateral side 34, and a pair of first angled sides 36. The first lateral side 32 has a length that is greater than a length of the second lateral side 34.

Each of the first angled sides 36 angles towards the second lateral side 34 from the first lateral side 32. Each of the first angled sides 36 forms an angle with respect to the first lateral side 32. Moreover, the angle corresponding to each of the first angled sides 36 is complementary with each other. A pair of uprights 38 is coupled to and extends upwardly from the second surface 24 of the panel 20. Each of the uprights 38 is aligned with an associated one of the first angled sides 36 thereby orienting each of the uprights 38 along the complementary angles. In this way each of the uprights 38 may be positioned to extend upwardly along an associated one of a pair of intersecting surfaces 40 on the article of furniture 16 that define the corner 18 on the article of furniture 16. Each of the uprights 38 has a distal end 42 with respect to the panel 20 and the distal end 42 corresponding to each of the uprights 38 is rounded.

A plurality of scratch pads 44 is provided and each of the scratch pads 44 is releasably positioned on the stand 12 to cover the corner 18 on the article of furniture 16. Each of the scratch pads 44 is comprised of a deformable material such as layered, corrugated cardboard or the like. Thus, each of the scratch pads 44 may be scratched by a feline thereby satisfying the feline's urge to scratch. Each of the scratch pads 44 has a front surface 46, a back surface 48 and an outer surface 50 extending therebetween.

A pair of mounts 52 is provided and each of the mounts 52 is coupled to an associated one of the scratch pads 44. Each of the mounts 52 releasably engages the stand 12 thereby retaining the scratch pads 44 on the stand 12. Each of the mounts 52 has a primary surface 54, a secondary surface 56 and a peripheral surface 58 extending therebetween. The primary surface 54 of each of the mounts 52 is coupled to the back surface 48 of the associated scratch pad 44. The peripheral surface 58 corresponding to each of the mounts 52 has a top side 60 and a bottom side 62.

The peripheral surface 58 corresponding to each of the mounts 52 has an aperture 64 extending through the top side 60 and the bottom side 62 of the corresponding mount. The aperture 64 corresponding to the bottom side 62 on each of the mounts 52 insertably receives the distal end 42 of an associated one of the uprights 38. Thus, each of the scratch pads 44 may be removed and replaced on the stand 12 without removing the article of furniture 16 from the stand 12. Each of the mounts may comprise a plurality of horizontal members extending between A corner pad 66 is provided and the corner pad 66 has a plurality of intersecting sides 68 such that the corner pad 66 has a prismatic triangular shape. The corner pad 66 is positioned at an intersection between each of the scratch pads 44. Moreover, the corner pad 66 fills the empty space between each of the scratch pads 44 at the intersection. The corner pad 66 is comprised of a deformable material, such as layered, corrugated cardboard or the like.

In use, the panel 20 is slid beneath the leg on the article of furniture 16 such that each of the uprights 38 extends upwardly along the corner 18 on the article of furniture 16. Each of the scratch pads 44 is positioned on the associated upright to cover the corner 18 on the article of furniture 16. In this way each of the scratch pads 44 protects the corner 18 on the article of furniture 16 and each of the scratch pads 44 provides a surface for the feline to scratch. Each of the scratch pads 44 may be removed from the uprights 38 without moving the article of furniture 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A feline scratch pad assembly being configured to be positioned on furniture thereby protecting the furniture from being scratched by a feline, said assembly comprising:
   a stand being configured to have a foot of an article of furniture positioned thereon, said stand being configured to extend upwardly along a corner on the article of furniture;
   a plurality of scratch pads, each of said scratch pads being releasably positioned on said stand wherein each of said scratch pads is configured to cover the corner on the article of furniture, each of said scratch pads being comprised of a deformable material wherein each of said scratch pads is configured to be scratched by a feline thereby satisfying the feline's urge to scratch; and
   a pair of mounts, each of said mounts being coupled to an associated one of said scratch pads, each of said mounts releasably engaging said stand thereby retaining said scratch pads on said stand.

2. The assembly according to claim 1, wherein said stand comprises a panel having a first surface, a second surface and a peripheral edge extending therebetween, said peripheral edge having a plurality of intersecting sides such that said panel has an elongated hexagonal shape, said first surface being configured to be positioned on a support surface, said second surface being configured to have the foot of the article of furniture positioned thereon.

3. The assembly according to claim 2, wherein said plurality of intersecting sides includes a first lateral side, a second lateral side, and a pair of first angled sides, said first lateral side having a length being greater than a length of said second lateral side, each of said first angled sides angling towards said second lateral side from said first lateral side, each of said first angled sides forming an angle with respect to said first lateral side such that said angle corresponding to each of said first angled sides is complementary with each other.

4. The assembly according to claim 1, further comprising:
   a panel having a second surface and a pair of first angled sides; and
   a pair of uprights, each of said uprights being coupled to and extending upwardly from said second surface of said panel, each of said uprights being aligned with an associated one of said first angled sides wherein each of said uprights is configured to be aligned with an associated one of a pair of intersecting surfaces on the article of furniture that define the corner on the article of furniture, each of said uprights having a distal end with respect to said panel, said distal end corresponding to each of said uprights being rounded.

5. The assembly according to claim, 4 wherein each of said mounts has a primary surface, a secondary surface and a peripheral surface extending therebetween, said peripheral surface corresponding to each of said mounts having a top side and a bottom side, said peripheral surface corresponding to each of said mounts having an aperture extending through said top side and said bottom side of said corresponding mount.

6. The assembly according to claim 5, wherein said aperture corresponding to said bottom side on each of said mounts insertably receives said distal end of an associated one of said uprights thereby facilitating each of said scratch pads to be removed and replaced on said stand when the article of furniture is on said stand.

7. A feline scratch pad assembly being configured to be positioned on furniture thereby protecting the furniture from being scratched by a feline, said assembly comprising:
   a stand being configured to have a foot of an article of furniture positioned thereon, said stand being configured to extend upwardly along a corner on the article of furniture, said stand comprising:
      a panel having a first surface, a second surface and a peripheral edge extending therebetween, said peripheral edge having a plurality of intersecting sides such that said panel has an elongated hexagonal shape, said first surface being configured to be positioned on a support surface, said second surface being configured to have the foot of the article of furniture positioned thereon, said plurality of intersecting sides including a first lateral side, a second lateral side, and a pair of first angled sides, said first lateral side having a length being greater than a length of said second lateral side, each of said first angled sides angling towards said second lateral side from said first lateral side, each of said first angled sides forming an angle with respect to said first lateral side such that said angle corresponding to each of said first angled sides is complementary with each other, and
      a pair of uprights, each of said uprights being coupled to and extending upwardly from said second surface of said panel, each of said uprights being aligned with an associated one of said first angled sides wherein each of said uprights is configured to be aligned with an associated one of a pair of intersecting surfaces on the article of furniture that define the corner on the article of furniture, each of said uprights having a distal end with respect to said panel, said distal end corresponding to each of said uprights being rounded;
   a plurality of scratch pads, each of said scratch pads being releasably positioned on said stand wherein each of said scratch pads is configured to cover the corner on the article of furniture, each of said scratch pads being comprised of a deformable material wherein each of said scratch pads is configured to be scratched by a feline thereby satisfying the feline's urge to scratch, each of said scratch pads having a front surface, a back surface and an outer surface extending therebetween; and
   a pair of mounts, each of said mounts being coupled to an associated one of said scratch pads, each of said mounts releasably engaging said stand thereby retaining said scratch pads on said stand, each of said mounts having a primary surface, a secondary surface and a peripheral surface extending therebetween, said peripheral surface corresponding to each of said mounts having a top side and a bottom side, said peripheral surface corresponding to each of said mounts having an aperture extending through said top side and said bottom side of said corresponding mount, said aperture corresponding to said bottom side on each of said mounts insertably receiving said distal end of an associated one of said uprights thereby facilitating each of said scratch pads to be removed and replaced on said stand when the article of furniture is on said stand.

* * * * *